United States Patent
Smith et al.

(10) Patent No.: US 11,743,198 B1
(45) Date of Patent: *Aug. 29, 2023

(54) SYSTEMS AND METHODS FOR TRAFFIC CLASSIFICATION

(71) Applicant: T-Mobile USA, Inc., Bellevue, WA (US)

(72) Inventors: Jeffery A. Smith, Bothell, WA (US); Rahul Pal, Bellevue, WA (US); Geeta Khetan, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/343,250

(22) Filed: Jun. 9, 2021

(51) Int. Cl.
*H04L 47/2441* (2022.01)
*H04W 12/03* (2021.01)
*H04W 28/12* (2009.01)
*H04L 47/2475* (2022.01)
*H04L 47/2483* (2022.01)

(52) U.S. Cl.
CPC ...... *H04L 47/2441* (2013.01); *H04L 47/2475* (2013.01); *H04L 47/2483* (2013.01); *H04W 12/03* (2021.01); *H04W 28/12* (2013.01)

(58) Field of Classification Search
None
See application file for complete search history.

(56) References Cited

U.S. PATENT DOCUMENTS

| | | | |
|---|---|---|---|
| 2008/0127255 A1* | 5/2008 | Ress | H04N 21/6334 348/E7.071 |
| 2010/0146085 A1* | 6/2010 | Van Wie | A63F 13/30 709/224 |
| 2012/0287784 A1* | 11/2012 | Shatzkamer | H04W 28/26 370/230.1 |
| 2013/0007263 A1* | 1/2013 | Soroushian | H04N 21/2662 709/224 |
| 2017/0085622 A1* | 3/2017 | Gopinath | H04L 67/1001 |
| 2020/0195981 A1* | 6/2020 | Chiaverini | H04N 21/4621 |
| 2020/0288212 A1* | 9/2020 | Alvarez Dominguez | H04L 45/22 |
| 2021/0120048 A1* | 4/2021 | Gu | H04M 7/006 |
| 2021/0122261 A1* | 4/2021 | Qiao | B60L 53/68 |
| 2021/0258350 A1* | 8/2021 | Buck | H04L 61/4511 |
| 2021/0282003 A1* | 9/2021 | Li | H04W 8/28 |

* cited by examiner

*Primary Examiner* — Eunsook Choi
(74) *Attorney, Agent, or Firm* — Lee & Hayes, P.C.

(57) ABSTRACT

Systems and methods for classifying a traffic flow on a network to determine parameters are described herein. The systems and methods use a policy API of a cellular network to allow entities to self-identify when, for example, their traffic flows may be encrypted or the identity of the originating location is obfuscated. The requesting entity accesses the policy API and transmits a self-identification request for a particular set of parameters to be used for subsequent traffic flows from the self-identification requesting entity. The cellular network may use the self-identification requests to allocate resources according to the parameters listed in the self-identification request without requiring the cellular network to decrypt the transmissions or analyze the transmissions to determine parameters.

17 Claims, 5 Drawing Sheets

SYSTEMS AND METHODS FOR TRAFFIC CLASSIFICATION

BACKGROUND

Traffic over wireless, wired, and cellular networks has increasingly shifted to encrypted protocols. While the increased use of encrypted protocols can help increase the security and safety of traffic over these networks, the use of encrypted protocols has created several issues for those networks. For example, various services that are provided over these networks may have policies that regulate the use of the networks. An example of this may be a video streaming service, a streaming game service, or a social media network that is provided with a certain amount of bandwidth, quality of service, and the like by the network. However, in some cases, policies may not be reliably applied to encrypted traffic, making it difficult to provide a promised or intended service level.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Examples of the present disclosure can comprise systems and methods for network traffic classification. In some examples, the classification of traffic can provide information to enforce various policies established by a network and to provide for a higher level of user engagement. In conventional systems, when a service uses unencrypted network traffic flow, a network operator may use information about the traffic flow to identify the source and/or type of flow. The network operator can then implement policies that govern how that particular flow type and/or source may utilize network resources. The use of policies helps to ensure that agreed upon parameters, such as available bandwidth, priority, quality of service ("QoS"), and the like are met without allowing a service to utilize too many resources. However, there has been a shift to the use of encrypted protocols. While network operators may have been able to determine some information about traffic flows using older, known encrypted protocols, new encryption standards are being introduced that may further obfuscate certain signals that network operators may use for the classification, insight into, and enforcement of policies. Further, onboarding new classifications (requiring potentially new policies) may take a relatively long amount of time and may not be readily modifiable when services modify their traffic flow patterns.

To provide for the identification of traffic flows, thus allowing policy enforcement and improved network operation, various examples of the presently disclosed subject matter utilize an application programming interface ("API") to be used by various services. The API is a self-identification feature that allows services to identify themselves using a self-identification request (sometimes referred to herein as a "request") transmitted to a policy application API, while still allow traffic flow to remain encrypted. The services query the API and request access based on the query. Based on the query (or request), the next traffic flow may be classified as the specific service requesting access. For example, a game streaming service may send a self-identification request to a network operator with traffic flow characteristics. The network operator checks the subscription level of the service and sends subscription level parameters to a server, such as a packet data network ("PDN") gateway ("PGW"). The PGW reads these parameters and classifies the next traffic flow as "game streaming," for example. The PGW then determines if a new bearer should be established to handle the traffic flow. It should be noted that the description of a PGW and a bearer are merely exemplary, as other means of determining and using a tunnel between a user equipment and a PDN (e.g. Internet) may be used and are considered to be within the scope of the presently disclosed subject matter.

Figure 1:
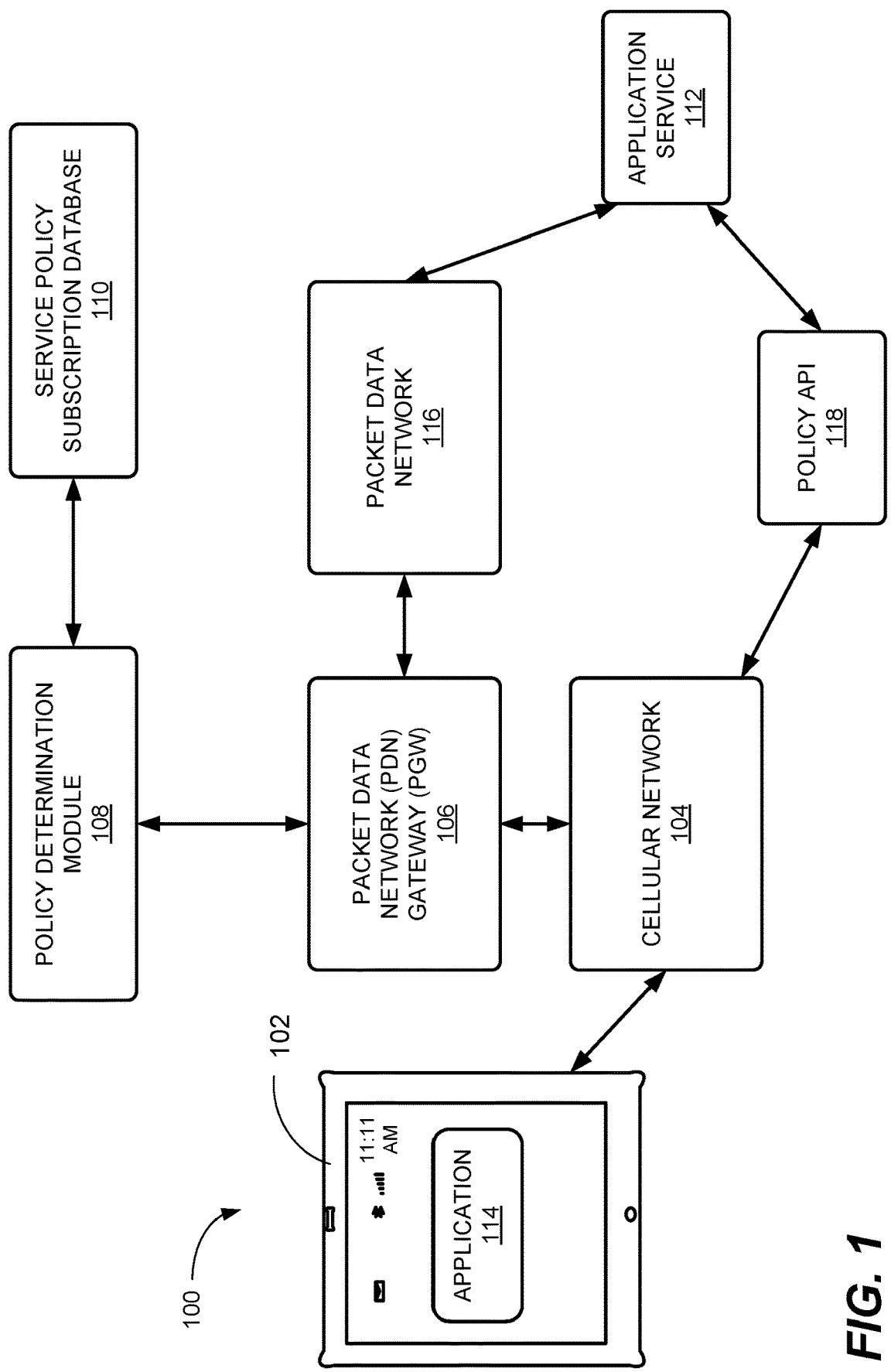
FIG. 1 illustrates an example environment for network traffic classification, in accordance with some examples of the present disclosure.

FIG. 1 illustrates an example environment 100 for network traffic classification, in accordance with some examples of the present disclosure. In some examples, the classification (including an identification) of a traffic flow can help associate a traffic flow from a source to a policy, the policy of which may include parameters such as allowed bandwidth, priority, Quality of Service, and the like. The presently disclosed subject matter is not limited to any particular parameter associated with a particular policy. The environment 100 includes a user equipment ("UE") 102 that can receive and transmit information to a cellular network 104. Examples of the UE 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network, such as the cellular network 104 or another network.

In general, the cellular network 104 can be implemented as a variety of technologies to provide wired and/or wireless access to a network, as discussed herein. In some instances, the cellular network 104 can include a 3GPP Radio Access Network ("RAN"), such a GSM/EDGE RAN (GERAN), a Universal Terrestrial RAN (UTRAN), a New Radio (for 5G), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the cellular network 104 can include any number and type of transceivers and/or base stations representing any number and type of macrocells, microcells, picocells, or femtocells, for example, with any type or amount of overlapping coverage or mutually exclusive coverage.

In some instances, the cellular network 104 may be communicatively coupled with a packet data network (PDN) gateway (PGW) 106, which in turn can be communicatively coupled with a policy determination module 108. In turn, the policy determination module 108 can be communicatively coupled to a service policy subscription database 110 to provide information about policies relating to various services. In general, the PGW 106 can be implemented as a network function including functionality to enforce policies, manage QoS (at least in part), and to inspect packets for viruses or other data. In some instances, the PGW 106 can include functionality to provide an interface between the cellular network 104 and other packet data networks, such as the internet, or other session initiation protocol (SIP)-based IP (internet protocol) multimedia subsystems (IMS) networks. In general, the policy determination module 108 can be implemented as a network function including functionality to support unified policy framework to govern network behavior, provide policy rules to control plane functions and/or enforce such rules, and/or implement a front end to access subscription information relevant for policy decisions in a data repository.

It should be understood that various additional modules associated with cellular networks or other RANs are not illustrated herein merely for purposes of description and not to limit the application of the examples described herein to cellular networks or RANs without those modules. For example, in some instances, the environment 100 can further include one or more communication servers to facilitate communications by and between the various devices in the environment 100. That is, environment 100 can include any computing devices implementing various aspects of one or more of second, third, fourth, and fifth generation (2G, 3G, 4G, 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G communication technologies. Thus, the environment 100 may implement GSM, UMTS, LTE/LTE Advanced, and/or NR telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the cellular network 104, and any endpoints. In some embodiments, the cellular network 104, the PGW 106, the policy determination module 108, and the service policy subscription database 110 are operated by a service provider.

While FIG. 1 illustrates the environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

The environment 100 further includes an application service 112. The application service 112 can provide various services for an application 114 on the UE 102. For example, the application 114 may be a gaming application that plays a game streamed using the application service 112. In another example, the application 114 may be a video streaming service that receives video from and uploads video to the application service 112, in which case the application service 112 may be a video streaming and uploading service. The various examples presented herein are not limited to any type of service provided by the application service 112.

In some examples, to access services provided by the application service 112, the application 114 transmits a communication to the application service 112 through the cellular network 104 and the PGW 106. The PGW 106 accesses the PDN 116 (in this example, the Internet, though other types of PDNs are considered to be within the scope of the presently disclosed subject matter). The PDN 116 establishes communication with the application service 112 to create a communication channel between the application 114 and the application service 112.

In some examples, the communication between the application service 112 and the application 114 through the cellular network 104 is governed by one or more policies. These policies include various parameters that are used by the cellular network 104. As mentioned above, the parameters can include items such as bandwidth allotted, priority of communications, QoS, speed of connection, etc. When application services, such as the application service 112, transmit their communications in an unencrypted manner, the policy determination module 108 can access the service policy subscription database 110 and determine the policy because the identity of the application service 112 and the type of traffic can be readily determined. However, in some examples, if the application service 112 uses encryption or otherwise obfuscates the type and/or original of the traffic flow, the cellular network 104 may not have enough information to determine a policy.

To provide for a way to determine an applicable policy, the environment 100 further includes a policy application programming interface ("API") 118. The policy API 118 is a module that allows the application service 112 to communicate with the cellular network 104 to request a set of parameters for communications. It should be noted, however, that in some examples, the application 114 may also send a self-identification request to the policy API 118, as the presently disclosed subject matter is not limited to either the application service 112 or the application 114 transmitting the self-identification request. The policy API 118 is used by the cellular network 104 to classify a traffic flow between the application service 112 and the application 114. In some examples, new services, such as those from the application service 112, may be onboarded without the need to update various policies. The policy API 118 is used by the application 114 or the application 112 to "self-identify" the service without the need to decrypt all or part of the traffic flow to allow the cellular network 104 to classify the traffic flow. The application service 112 may send a self-identification request (sometimes referred to herein as a "request")

to establish parameters for service according to a policy stored in the service policy subscription database 110.

For example, the application service 112 may, in an initial traffic flow, request that subsequent traffic flows be transmitted by a certain resolution (e.g. SD, HD, and the like) or speed (e.g. 1.5 Mbps). The cellular network 104 receives the request and instructs the PGW 106 to classify the next traffic flows of the application service 112 according to the request. In some examples, the next traffic flows may be automatically provided at the parameters requested in the API call transmitted by the application service 112 to the policy API 118. In other examples, the traffic flows may be handled according to default parameters until the request from the application service 112 is verified against one or more policies stored in the service policy subscription database 110. If the subsequent traffic flows are transmitted according to the request and the verification of the parameters determines that the request is not correct (e.g. too high of resolution, bandwidth, speed, and the like), the cellular network 104 may reduce the traffic flows to the parameters established in one or more policies stored in the service policy subscription database 110.

In some examples, when a policy API 118 request is made by the application service 112, the policy determination module 108 may determine the parameters associated with one or more policies stored in the service policy subscription database 110. The cellular network 104 may receive those parameters and determine that the current configuration of the cellular network 104 cannot provide a service level at the level of one or more of the parameters. In this example, the cellular network 104 may use the parameters to establish one or more tunnels, or bearers, between the application service 112 and the application 114 (as well as potentially other applications). In some examples, the bearer may be a dedicated bearer used by the cellular network 104 for future traffic flows associated with the application service 112.

In another example, a port or port ranges may be determined from the classification. As is known, a port identifies a specific process or type of network service. When a policy API 118 request is made by the application service 112, the policy determination module 108 may determine the parameters associated with one or more policies stored in the service policy subscription database 110. The cellular network 104 may receive those parameters and determine that the subsequent traffic flows are to be classified within port ranges (or a specific port) defined in the request.

Figure 2:
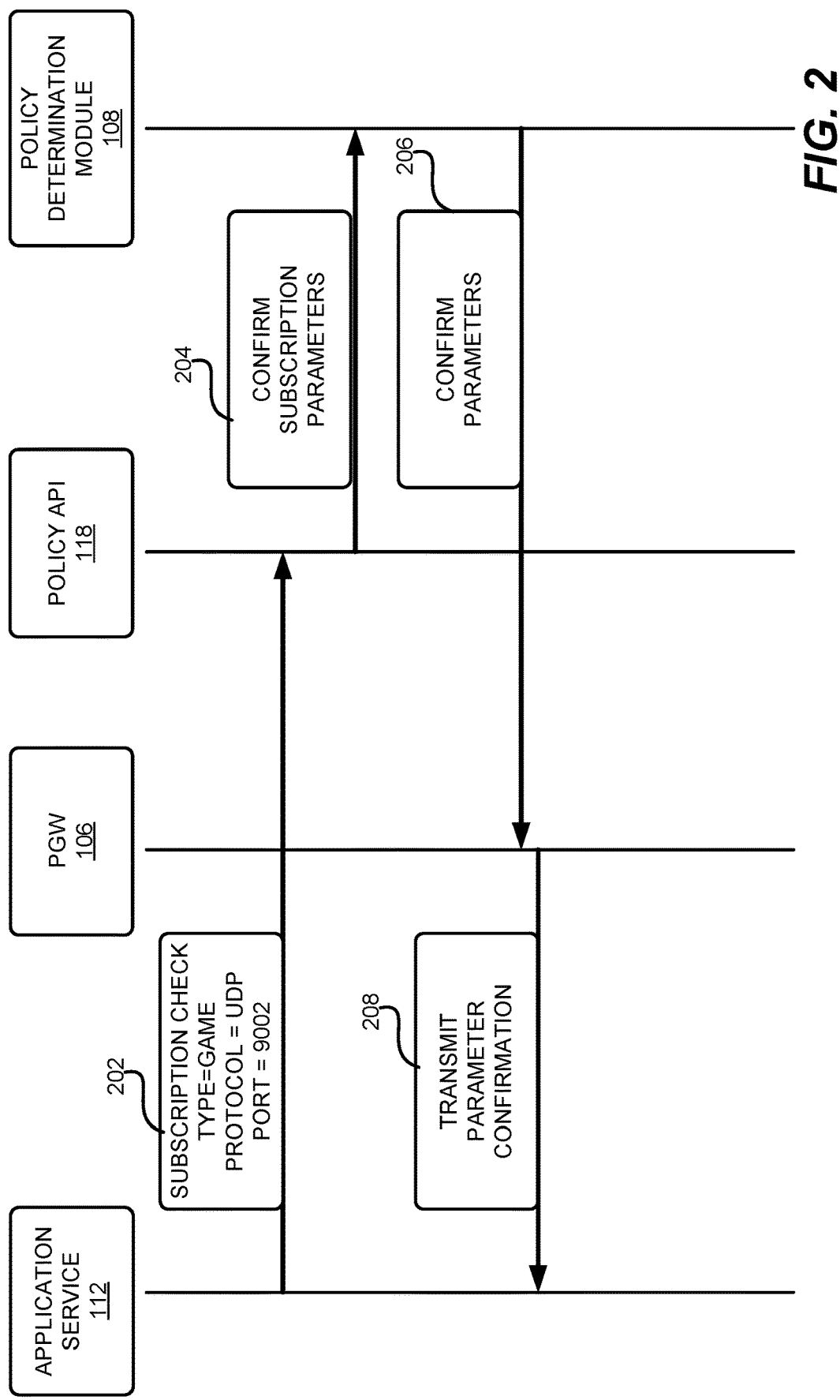
FIG. 2 is an example signal flow diagram for network traffic classification, in accordance with some examples of the present disclosure.

FIG. 2 is an example signal flow diagram for network traffic classification, in accordance with some examples of the present disclosure. In the example illustrated in FIG. 2, the application service 112 transmits to the policy API 118 a request 202. It should be noted that in some examples, the application 114 may transmit the request 202. The request 202, in the example illustrated in FIG. 2, is a request for a certain level of service, or other parameters. In the example illustrated in FIG. 2, the parameters are the type of communication ("Game" or game streaming service), the protocol to be used ("UDP" or User Datagram Protocol), and a port, such as port 9002 in this present example. Other parameters may be requested and are considered to be within the scope of the presently disclosed subject matter. When the request of communication 202 is sent, the API 118 informs the PGW 106 of the request, allowing the PGW 106 to set subsequent traffic flows according to the request.

After receiving the communication 202, the policy API 118 causes the transmission of communication 204 to the policy determination module 108. The communication 204 confirms that the request of communication 202 can be provided. The policy determination module 108 determines if the requested parameters can be provided by the cellular network 104 and if the application service has permission to request the parameters. For example, the permission may be based on one or more policies associated with the application service 112 defining how communications to and from the application service 112 are handled. In the example provided in FIG. 2, the application service 112 requests UDP protocol. However, the application service 112 may already have a policy with the cellular network 104 that communications to and from the application service are to be Transmission Control Protocol ("TCP") communications, not UDP.

The policy determination module 108 determines the request is acceptable and causes the transmission of communication 206 to the PGW 106 in which the parameters are confirmed. The PGW 106 thereafter causes the transmission of communication 208 to the application service 112 that the request of communication 202 is acceptable. The PGW 106 also sets the communications according to the accepted parameters. If the policy determination module 108 determines that the subscription parameters requested were not acceptable, the policy determination module 108 may communicate with the PGW 106 to allow the PGW 106 to modify the communication parameters.

Figure 3:
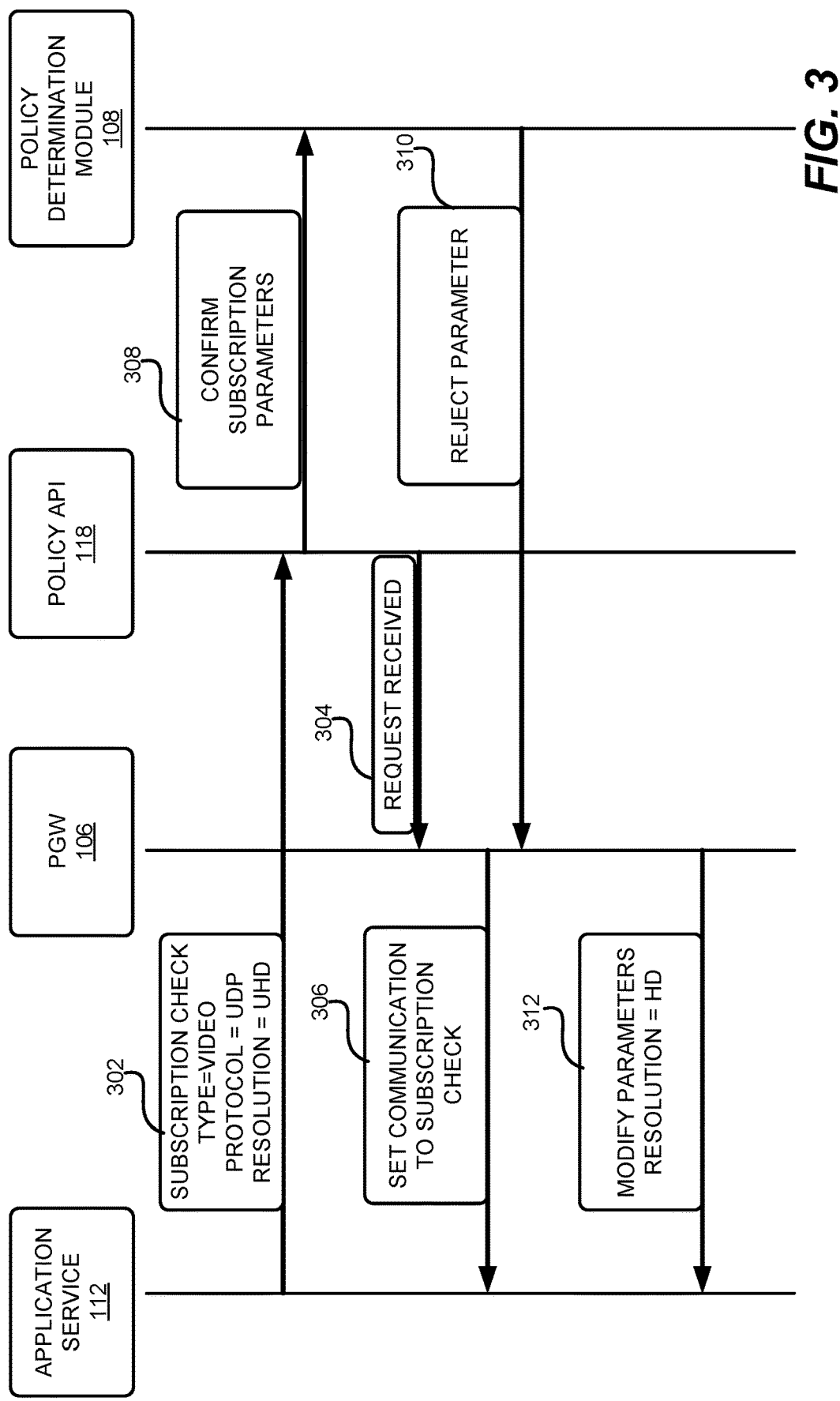
FIG. 3 is an example signal flow diagram for network traffic classification in which a PGW modifies a communication parameter, in accordance with some examples of the present disclosure.

FIG. 3 is an example signal flow diagram for network traffic classification in which the PGW 106 modifies a communication parameter, in accordance with some examples of the present disclosure. In the example illustrated in FIG. 3, the application service 112 transmits to the policy API 118 a request 302. The request 302, in the example illustrated in FIG. 3, is a request for a certain level of service, or parameters. In the example illustrated in FIG. 3, the parameters are the type of communication ("Video" or video streaming service), the protocol to be used ("UDP"), and a resolution of Ultra High Definition ("UHD"). Other parameters may be requested and are considered to be within the scope of the presently disclosed subject matter.

When the request of communication 302 is received by the policy API 118, the policy API 118 informs the PGW 106 of the request, by communication 304 allowing the PGW 106 to set subsequent traffic flows according to the requested parameters through communication 306. Additionally, the policy API 118 causes the transmission of communication 308 to the policy determination module 108. The communication 306 confirms that the request of communication 302 can be provided.

The policy determination module 108 determines if the requested parameters can be provided by the cellular network 104 and if the application service has permission to request the parameters. For example, the permission may be based on one or more policies associated with the application service 112 defining how communications to and from the application service 112 are handled.

In the example illustrated in FIG. 3, the policy determination module 108 determines the request is not acceptable and causes the transmission of communication 310 to the PGW 106 in which the parameters are rejected. The PGW 106 thereafter causes the transmission of communication 312 to the application service 112 that the request of communication 302 is not acceptable. The PGW 106 also sets the communications according to acceptable parameters. In the example illustrated in FIG. 3, the unacceptable parameter was the UHD resolution. Thus, the PGW 106 cause the modification of communication parameters so that the communication is High Definition ("HD").

Figure 4:
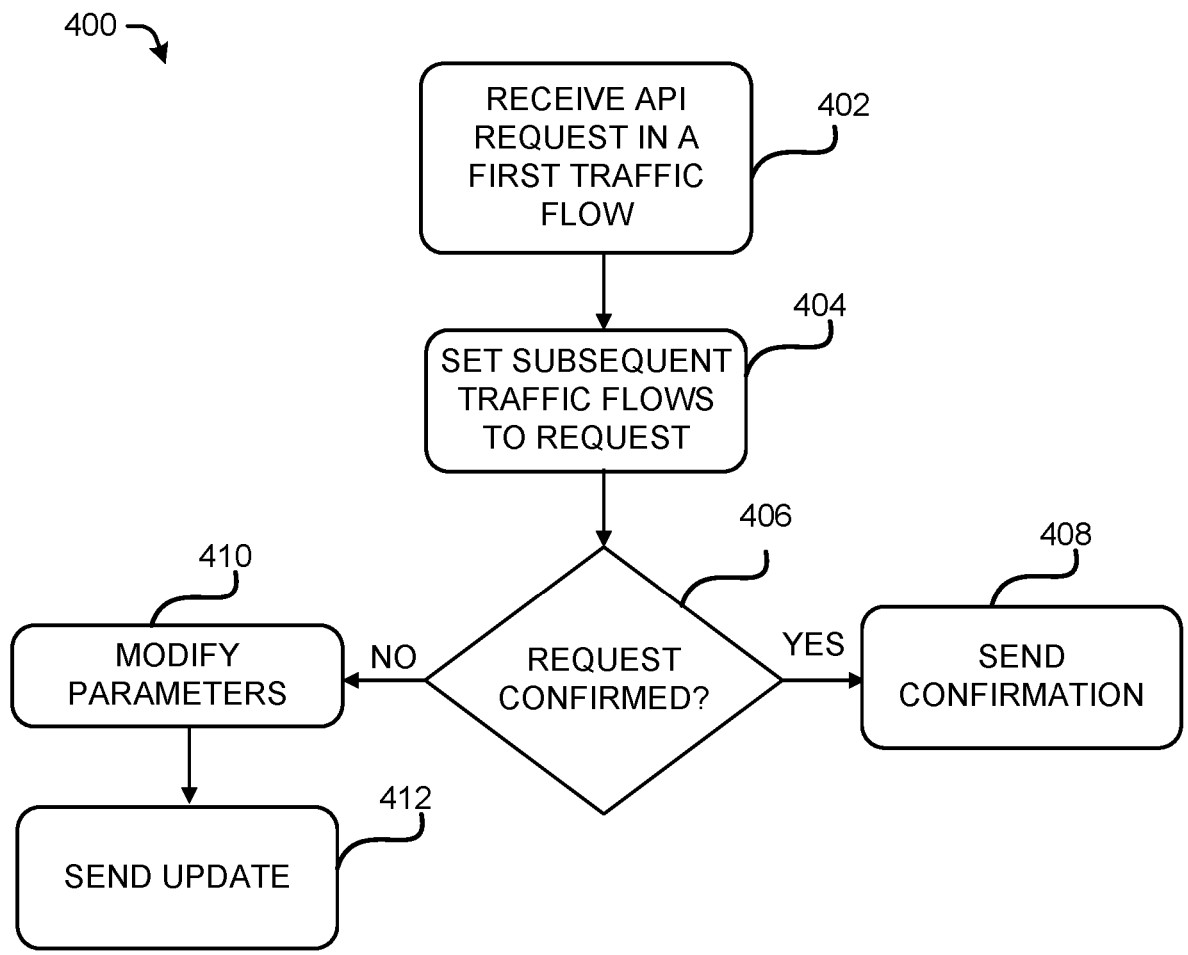
FIG. 4 is an illustrative process for classifying a traffic flow, in accordance with some examples of the present disclosure.

FIG. 4 is an illustrative process 400 for classifying a traffic flow, in accordance with some examples of the present disclosure. The process 400 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The process 400 commences at operation 402, where an API request is received at the policy API 118. As noted above, the application service 112 and/or the application 114 can send the request to the policy API 118. The request can include a request for parameters to be established for the communication. In this manner, the application service 112 or the application 114 identifies itself to the cellular network 104 through the use of the policy API 118. This allows the cellular network 104 to establish the correct communication parameters even if the traffic flow from the application service 112 and/or the application 114 is encrypted or obfuscated.

The process 400 continues to operation 404, where the cellular network 104 sets subsequent traffic flows from the requesting entity, i.e. the application service 112 or the application 114, to the parameters in the request. The cellular network 104 may do this to maintain a high level of service while the request is confirmed. In some examples, operation 404 does not occur until the request is confirmed. In some examples, when the policy API 118 receives the request, the policy API 118 causes the cellular network to both confirm the request and set the next traffic flows received from the requesting entity to the levels of the request.

The process 400 continues to operation 406, where the policy determination module 108 is queried to determine if the request is confirmed. The policy determination module 108 accesses the service policy subscription database 110. The service policy subscription database 110 has stored therein the policies associated with various requesting entities and/or types of requesting entities. For example, the requesting entity may be a known entity with previously agreed upon parameters. In some examples, the known entity may have a contract with a provider or operator of the cellular network 104 that guarantees certain parameters. In another example, the requesting entity may not be known, but the type of the requesting entity may be known and recognized by the cellular network 104. For example, the requesting entity may be a game streaming service. The cellular network 104 may have a policy that establishes a set of parameters for entities that are game streaming services. Thus, if the requesting entity, even if not previously known to the cellular network 104, may use the policy API 118 to identity itself as a game streaming service to gain the benefit of the game streaming policy parameters rather than the default parameters the cellular network 104 may have established.

If the request is confirmed at operation 406, the process 400 continues to operation 408, where a confirmation is transmitted to the requesting entity. In some examples, the confirmation provides the requesting entity information that it will be able to continue traffic flows at the requested parameters. In some examples of the presently disclosed subject matter, a confirmation is not transmitted at operation 408. In these examples, the requesting entity or the cellular network 104 may be configured so that the parameters are simply maintained if the request is confirmed and no further acknowledgement is needed or required. In these examples, operation 408 may be optional. The process 400 thereafter ends.

If the request is not confirmed at operation 406, the process 400 continues to operation 410, where the parameters of the traffic flows are modified. As mentioned above, the traffic flows after a request may be set according to the requested parameters. However, if the parameters are not allowable or confirmable, then once that information is known to the cellular network 104, the cellular network 104 may modify the parameters to either a default level or a confirmable or allowable level. For example, the request from an entity may be for resolution at UHD; however, the only confirmable resolution parameter above a standard definition level may be HD. Therefore, rather than lowering the resolution to SD, the cellular network 104 may lower the resolution to HD.

The process 400 continues to operation 412, where an update is transmitted to the requesting entity. In some examples, the update may be to inform the requesting entity that the requested parameters were not acceptable, and/or to inform the requesting entity that the traffic flows have either been modified to be set at default parameters or modified to be set at allowable or confirmable parameters. This provides information to the requesting entity that, among other possibilities, that the policy agreed upon between the requesting entity and the cellular network 104 may be incorrect or outdated, that the request was incorrect, or that the type of requesting entity indicated in the request is incorrect. It should be understood that in some examples, operation 412 may not be performed. The process 400 thereafter ends.

Figure 5:
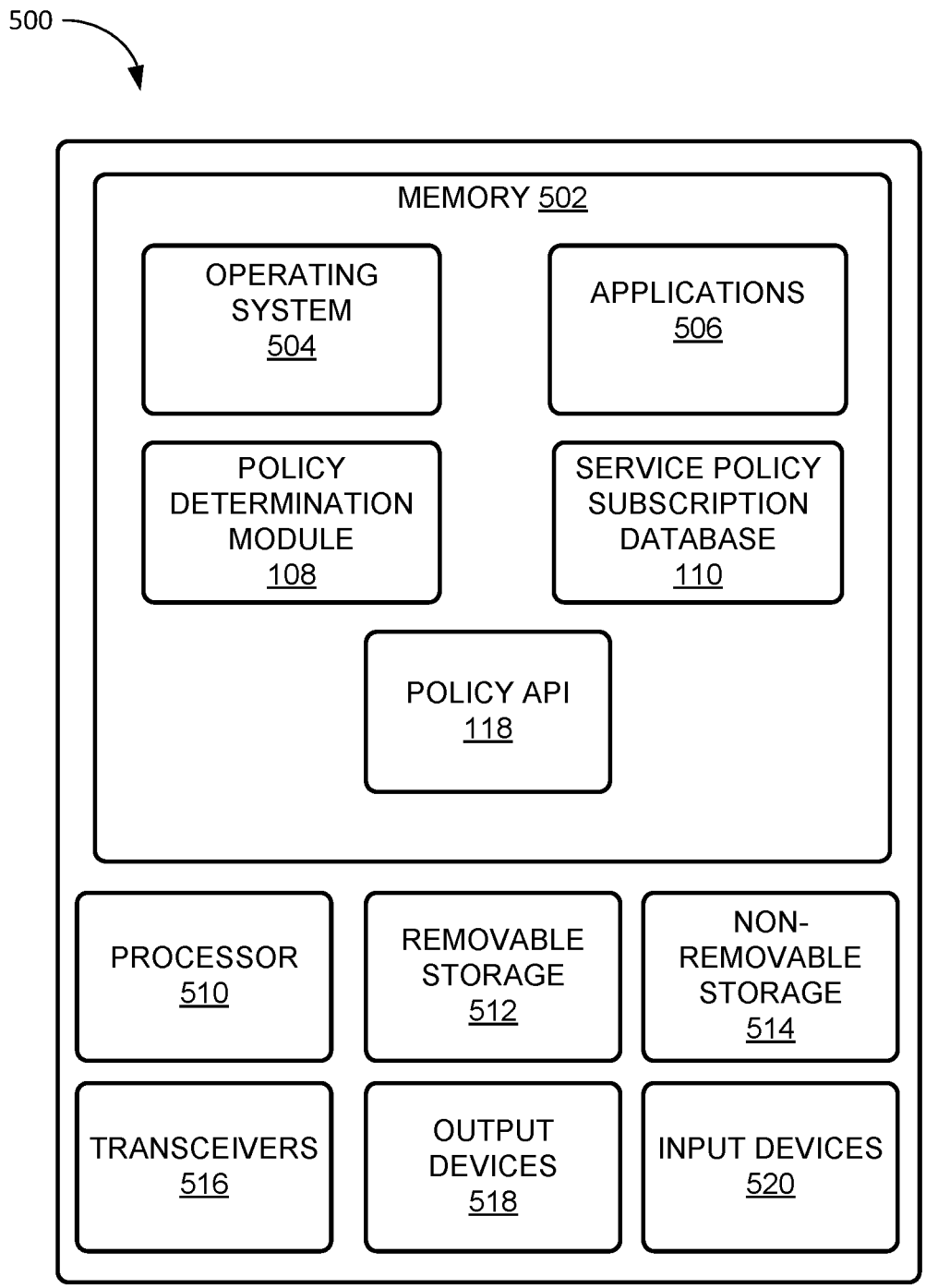
FIG. 5 depicts a component level view of a server computer for use with the systems and methods described herein, in accordance with some examples of the present disclosure.

FIG. 5 depicts a component level view of a server computer 500 for use with the systems and methods described herein. The server computer 500 could be any device or combination of devices capable of providing the functionality associated with the systems and methods described herein. The server computer 500 can comprise several components, modules, software functions, or computing devices to execute the above-mentioned functions. The server computer 500 may be comprised of hardware, software, or various combinations thereof. As discussed below, the server computer 500 can comprise memory 502 including an operating system (OS) 504 and one or more standard applications 506. The standard applications 506 may include applications that provide for communication with the cellular network 104, the application service 112, and the UE 102. The OS 504 varies depending on the manufacturer of the server computer 500. The OS 504 contains the modules and software that support basic functions of the server computer 500, such as scheduling tasks, executing applications, and controlling peripherals. In some examples, the OS 504 can enable the policy determination module 108 and the policy API 118, and provide other functions, as described above, via the transceiver(s) 516. The OS 504 can also enable the server computer 500 to send and retrieve other data and perform other functions.

The server computer 500 memory 502 can also comprise instructions that, when executed by the server computer 500 or another entity execute the policy API 118, the policy determination module 108. The memory 502 may also include the service policy subscription database 110. It should be noted that, in some examples, the service policy subscription database 110, or portions thereof, may be stored in a database controlled by another entity. For example, operators of various cellular networks may agree to maintain a certain level of parameters for a specific service type. In some examples, to avoid disparate or disjointed policies because of the polices being stored on locally controlled cellular network databases, the portions relating to the commonly agreed upon policies may be stored centrally and accessed by each of the cellular networks. This allows for maintaining consistency as well as ease of updating policies.

The server computer 500 can also comprise one or more processors 510 and one or more of removable storage 512, non-removable storage 514, transceiver(s) 516, output device(s) 518, and input device(s) 520. In various implementations, the memory 502 can be volatile (such as random access memory (RAM)), non-volatile (such as read only memory (ROM), flash memory, etc.), or some combination of the two.

In some implementations, the processor(s) 510 can be one or more central processing units (CPUs), graphics processing units (GPUs), both CPU and GPU, or any other combinations and numbers of processing units. The server computer 500 may also include additional data storage devices (removable and/or non-removable) such as, for example, magnetic disks, optical disks, or tape. Such additional storage is illustrated in FIG. 4 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the server computer 500. Any such non-transitory computer-readable media may be part of the server computer 500 or may be a separate database, databank, remote server, or cloud-based server.

In some implementations, the transceiver(s) 516 include any transceivers known in the art. In some examples, the transceiver(s) 416 can include wireless modem(s) to facilitate wireless connectivity with other components (e.g., between the server computer 500 and a wireless modem that is a gateway to the Internet), the Internet, and/or an intranet. Specifically, the transceiver(s) 516 can include one or more transceivers that can enable the server computer 500 to send and receive data using the cellular network 104. Thus, the transceiver(s) 516 can include multiple single-channel transceivers or a multi-frequency, multi-channel transceiver to enable the server computer 500 to send and receive video calls, audio calls, messaging, etc. The transceiver(s) 516 can enable the server computer 500 to connect to multiple networks including, but not limited to 2G, 3G, 4G, 5G, and Wi-Fi networks. The transceiver(s) can also include one or more transceivers to enable the server computer 500 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the server computer 500 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method, comprising:
receiving, at a policy application programming interface ("API") of a cellular network, a first self-identification request in a first traffic flow, wherein the first self-identification request comprises a first identification of a first entity transmitting the first self-identification request and first traffic flow parameters;
setting a plurality of second traffic flows to the first traffic flow parameters in the first self-identification request, wherein the plurality of second traffic flows occur before a confirmation of the first self-identification request is received by the cellular network;
accessing a policy determination module to confirm the first self-identification request;
maintaining a plurality of third traffic flows to the first traffic flow parameters in the first self-identification request, wherein the plurality of third traffic flows occur after the confirmation of the first self-identification request is received by the cellular network;

receiving, at the policy API of the cellular network, a second self-identification request in a fourth traffic flow, wherein the second self-identification request comprises a second identification of a second entity transmitting the second self-identification request and second traffic flow parameters;

setting a plurality of fifth traffic flows to the second traffic flow parameters in the second self-identification request, wherein the plurality of fifth traffic flows occur before a confirmation of the second self-identification request is received by the cellular network;

accessing the policy determination module to confirm the second self-identification request; and modifying at least one parameter of the second traffic flow parameters for a plurality of sixth traffic flows to a default parameter when the second self-identification request is not confirmed by the cellular network.

2. The method of claim 1 further comprising establishing a bearer for the first entity transmitting the first self-identification request to the policy API upon receipt of the first confirmation of the first self-identification request.

3. The method of claim 1, further comprising classifying the plurality of third traffic flows to a port or a port range defined in the first self-identification request.

4. The method of claim 1, further comprising transmitting a parameter confirmation to the first entity or the second entity.

5. The method of claim 1, wherein accessing the policy determination module to confirm the first self-identification request or the second self-identification request comprises accessing a service policy subscription database, wherein the service policy subscription database has stored therein policies associated with requesting entities or types of requesting entities.

6. The method of claim 1, wherein the first traffic flow parameters or the second traffic flow parameters comprise video resolution, bandwidth, speed of connection, port or port ranges, priority, and quality of service.

7. A non-transitory computer-readable storage medium having computer-executable instructions stored thereupon that, when executed by a computer, cause the computer to perform acts comprising:

receiving, at a policy application programming interface ("API") of a cellular network, a first self-identification request in a first traffic flow, wherein the first self-identification request comprises a first identification of a first entity transmitting the first self-identification request and first traffic flow parameters;

setting a plurality of second traffic flows to the first traffic flow parameters in the first self-identification request, wherein the plurality of second traffic flows occur before a confirmation of the first self-identification request is received by the cellular network;

accessing a policy determination module to confirm the first self-identification request;

maintaining a plurality of third traffic flows to the first traffic flow parameters in the first self-identification request, wherein the plurality of third traffic flows occur after the confirmation of the first self-identification request is received by the cellular network;

receiving, at the policy API of the cellular network, a second self-identification request in a fourth traffic flow, wherein the second self-identification request comprises a second identification of a second entity transmitting the second self-identification request and second traffic flow parameters;

setting a plurality of fifth traffic flows to the second traffic flow parameters in the second self-identification request, wherein the plurality of fifth traffic flows occur before a confirmation of the second self-identification request is received by the cellular network;

accessing the policy determination module to confirm the second self-identification request; and modifying at least one parameter of the second traffic flow parameters for a plurality of sixth traffic flows to a default parameter when the second self-identification request is not confirmed by the cellular network.

8. The method of claim 1, wherein the second traffic flows, the third traffic flows, the fifth traffic flows, or the sixth traffic flows are encrypted.

9. The non-transitory computer-readable storage medium of claim 7, further comprising computer-executable instructions that, when executed by the computer, cause the computer to perform the act comprising establishing a bearer for the first entity transmitting the first self-identification request to the policy API upon receipt of the first confirmation of the first self-identification request.

10. The non-transitory computer-readable storage medium of claim 7, further comprising computer-executable instructions that, when executed by the computer, cause the computer to perform the act comprising classifying the plurality of third traffic flows to a port or a port range defined in the first self-identification request.

11. The non-transitory computer-readable storage medium of claim 7, further comprising computer-executable instructions that, when executed by the computer, cause the computer to perform the act comprising transmitting a parameter confirmation to the first entity or the second entity.

12. The non-transitory computer-readable storage medium of claim 7, wherein accessing the policy determination module to confirm the first self-identification request or the second self-identification request comprises accessing a service policy subscription database, wherein the service policy subscription database has stored therein policies associated with requesting entities or types of requesting entities.

13. The non-transitory computer-readable storage medium of claim 7, wherein the first traffic flow parameters or the second traffic flow parameters comprise video resolution, bandwidth, speed of connection, port or port ranges, priority, and quality of service.

14. The non-transitory computer-readable storage medium of claim 7, wherein the second traffic flows, the third traffic flows, the fifth traffic flows, or the sixth traffic flows are encrypted.

15. A system comprising:

a memory storing computer-executable instructions; and a processor in communication with the memory, the computer-executable instructions causing the processor to perform acts comprising:

receiving, at a policy application programming interface ("API") of a cellular network, a first self-identification request in a first traffic flow, wherein the first self-identification request comprises a first identification of a first entity transmitting the first self-identification request and first traffic flow parameters;

setting a plurality of encrypted second traffic flows to the first traffic flow parameters in the first self-identification request, wherein the plurality of encrypted second traffic flows occur before a confirmation of the first self-identification request is received by the cellular network;

accessing a policy determination module to confirm the first self-identification request;

maintaining a plurality of encrypted third traffic flows to the first traffic flow parameters in the first self-identification request, wherein the plurality of encrypted third traffic flows occur after the confirmation of the first self-identification request is received by the cellular network;

receiving, at the policy API of the cellular network, a second self-identification request in a fourth traffic flow, wherein the second self-identification request comprises a second identification of a second entity transmitting the second self-identification request and second traffic flow parameters;

setting a plurality of encrypted fifth traffic flows to the second traffic flow parameters in the second self-identification request, wherein the plurality of encrypted fifth traffic flows occur before a confirmation of the second self-identification request is received by the cellular network;

accessing the policy determination module to confirm the second self-identification request; and modifying at least one parameter of the second traffic flow parameters for a plurality of encrypted sixth traffic flows to a default parameter when the second self-identification request is not confirmed by the cellular network.

16. The system of claim 15, further comprising computer-executable instructions for establishing a bearer for the first entity transmitting the first self-identification request to the policy API.

17. The system of claim 15, wherein the first traffic flow parameters or the second traffic flow parameters comprise video resolution, bandwidth, speed of connection, port or port ranges, priority, and quality of service.

* * * * *